US012627931B2

(12) United States Patent
He et al.

(10) Patent No.: US 12,627,931 B2
(45) Date of Patent: May 12, 2026

(54) SPEAKER

(71) Applicant: CHANGZHOU AMT CO., LTD, Changzhou (CN)

(72) Inventors: Zhaoyang He, Changzhou (CN); Lei Yang, Changzhou (CN)

(73) Assignee: CHANGZHOU AMT CO., LTD, Changzhou (CN)

( * ) Notice: Subject to any disclaimer, the term of this patent is extended or adjusted under 35 U.S.C. 154(b) by 169 days.

(21) Appl. No.: 18/557,057

(22) PCT Filed: Apr. 30, 2021

(86) PCT No.: PCT/CN2021/091577

§ 371 (c)(1),
(2) Date: Oct. 25, 2023

(87) PCT Pub. No.: WO2022/227026

PCT Pub. Date: Nov. 3, 2022

(65) Prior Publication Data

US 2024/0223955 A1 Jul. 4, 2024

(30) Foreign Application Priority Data

Apr. 25, 2021 (CN) ......................... 202120869807.4

(51) Int. Cl.
*H04R 9/02* (2006.01)
*H04R 7/18* (2006.01)
*H04R 9/04* (2006.01)

(52) U.S. Cl.
CPC ............... *H04R 9/025* (2013.01); *H04R 7/18* (2013.01); *H04R 9/047* (2013.01); *H04R 2207/021* (2013.01)

(58) Field of Classification Search
CPC .......... H04R 9/025; H04R 7/18; H04R 9/047; H04R 2207/021
See application file for complete search history.

(56) References Cited

U.S. PATENT DOCUMENTS

2018/0027335 A1* 1/2018 Li ............................ H04R 7/18 381/398
2023/0319481 A1* 10/2023 Wang ..................... H04R 9/025 381/386

FOREIGN PATENT DOCUMENTS

CN 206640782 U 11/2017
CN 111711896 A 9/2020
(Continued)

OTHER PUBLICATIONS

International Search Report of PCT Patent Application No. PCT/CN2021/091577 issued on Jan. 26, 2022.
(Continued)

*Primary Examiner* — Sunita Joshi
(74) *Attorney, Agent, or Firm* — Andrew C. Cheng

(57) ABSTRACT

The present application provides a speaker, which comprises a housing as well as a magnetic circuit system and a vibration system arranged the housing, the vibration system comprises a planar first voice coil which can generate mechanical motion under the action of a magnetic field of the magnetic circuit system, a planar first vibration diaphragm driven by the first voice coil, and the first voice coil is arranged on the first vibration diaphragm; the magnetic circuit system comprises a plurality of magnets, a gap is formed between the magnets, and at least a portion of the first voice coil corresponds to the gap between the magnets. The present speaker is different from a conventional moving-coil type speaker, and the speaker can be made smaller than a conventional moving-coil type speaker and with respect to high frequency performance, the speaker has higher sound pressure and a better bandwidth.

9 Claims, 11 Drawing Sheets

A-A

(56) References Cited

FOREIGN PATENT DOCUMENTS

| | | | | | |
|---|---|---|---|---|---|
| CN | 113099365 | A | | 7/2021 | |
| CN | 214413032 | U | * | 10/2021 | ............... H04R 9/02 |
| KR | 20050075787 | A | | 7/2005 | |
| KR | 20120122014 | A | | 11/2012 | |
| KR | 20160130797 | A | | 11/2016 | |
| KR | 20180050123 | A | | 5/2018 | |

OTHER PUBLICATIONS

The Office Action of KR patent application No. 10-2023-7040147 issued on Sep. 17, 2025.

* cited by examiner

A-A

B-B

SPEAKER

RELATED APPLICATION

The present application claims priority of Chinese patent application with the application number of 202120869807.4 and the title of "speaker" filed in the Patent Office of the People's Republic of China on Apr. 25, 2021, the entirety of which is hereby incorporated by reference.

TECHNICAL FIELD

The invention relates to the technical field of audio technology, in particular to a speaker.

BACKGROUND OF THE INVENTION

Traditional speakers are mostly moving-coil type, which usually including a vibration diaphragm, a voice coil and a magnet. and a magnet is arranged below a voice coil, and the voice coil vibrates under the action of a magnetic field to drive the vibration diaphragm to vibrate. Due to the limitation of the structure of the moving-coil type speaker, the volume of the moving-coil speaker is large and is difficult to improve.

BRIEF SUMMARY OF THE INVENTION

Technical Issue

The technical problem to be solved by the invention is to provide an improved speaker aiming at the defects in the related art.

Solution to the Issue

Technical Solution

The technical solution adopted by the invention to solve the technical problems comprises: providing a speaker, which comprises a housing, a magnetic circuit system and a vibration system, wherein the magnetic circuit system and the vibration system are arranged in the housing, and the vibration system comprises a planar first voice coil capable of generating mechanical motion under the action of a magnetic field of the magnetic circuit system, and a planar first vibration diaphragm driven by the first voice coil; the first voice coil is arranged on the first vibration diaphragm, the magnetic circuit system comprises a plurality of magnets, one or more gaps are formed among the magnets, and at least part of the first voice coil corresponds to the gap among the magnets.

Preferably, the first vibration diaphragm comprises an intermediate portion and a folding ring surrounding the periphery of the intermediate portion, and the folding ring is flat or arc-shaped.

Preferably, the magnetic circuit system comprises a first elongated magnet, a second elongated magnet and a third elongated magnet which are sequentially arranged at intervals, and at least a part of the first voice coil corresponds to a gap between the first elongated magnet and the second elongated magnet as well as a gap between the second elongate magnet and the third elongated magnet.

Preferably, the first elongated magnet, the second elongated magnet, and the third elongated magnet are square magnets.

Preferably, the magnetic circuit system comprises a first annular magnet and a second annular magnet, the second annular magnet surrounds the periphery of the first annular magnet, an annular gap is formed between the first annular magnet and the second annular magnet, and the first voice coil is correspondingly arranged in the gap between the first annular magnet and the second annular magnet.

Preferably, the magnetic circuit system comprises a first annular magnet, a second annular magnet surrounding the first annular magnet and a third annular magnet surrounding the second annular magnet, and the vibration system comprises a second voice coil and a second vibration diaphragm connected to the second voice coil and driven by the second voice coil. The first voice coil corresponds to a gap between the first annular magnet and the second annular magnet, and the second voice coil corresponds to a gap between the second annular magnet and the third annular magnet.

Preferably, the vibration system comprises a planar flaky dome, and the dome is arranged on the first vibration diaphragm.

Preferably, the dome is arranged in the middle of the first vibration diaphragm.

Preferably, the dome is disposed on the top surface of the first vibration diaphragm, or the dome is disposed on the bottom surface of the first vibration diaphragm, or the dome is embedded in the first vibration diaphragm and exposed upward and downward.

Preferably, the housing is circular, the first vibration diaphragm is circular, and the dome is circular; or the housing is square, the first vibration diaphragm is square, and the dome is square.

BENEFICIAL EFFECTS OF THE INVENTION

Beneficial Effects

The implementation of the technical solution of the invention has at least the following beneficial effects: the speaker is different from the conventional moving-coil type speaker, can be made smaller than the conventional moving-coil type speaker, and has higher sound pressure level and better bandwidth in high frequency performance.

BRIEF DESCRIPTION OF THE SEVERAL VIEWS OF THE DRAWINGS

Description the Drawings

In order to more clearly illustrate the technical solutions in the embodiments of the invention, the following is a brief introduction to the embodiments or the drawings used in the description of the prior art. Obviously, the drawings in the following description are only some embodiments of the invention. For those of ordinary skill in the art, other figures may also be derived from these figures.

Figure 1:
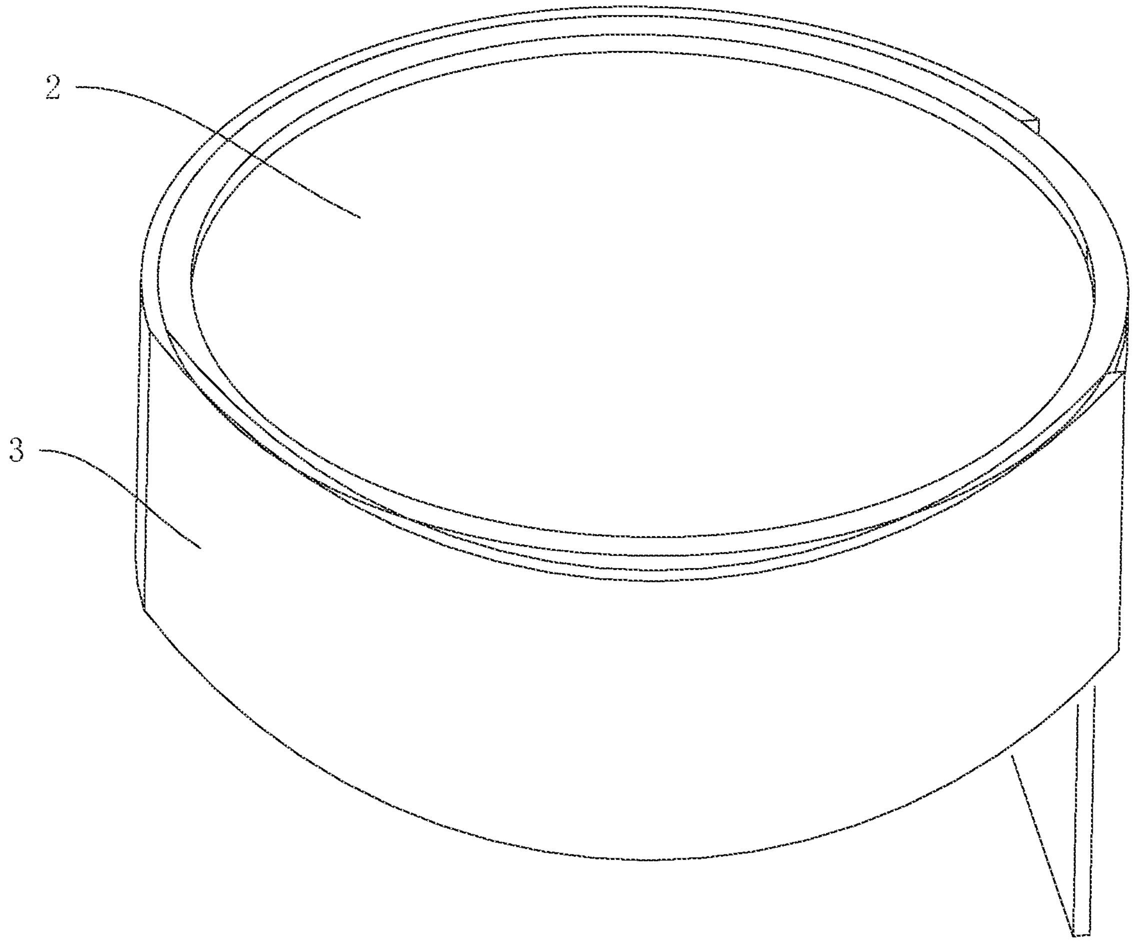
FIG. 1 is a perspective view of a speaker according to a first embodiment of the present invention.

The reference numerals in the drawing indicate a magnetic circuit system 1, a first elongated magnet 11*a*, a second elongated magnet 11*b*, a third elongated magnet 11*c*, a first annular magnet 12*a*, a second annular magnet 12*b*, a third annular magnet 12*c*, a vibration system 2, a first voice coil 211, a first vibration diaphragm 212, an intermediate portion 2121, a folding ring 2122, a dome 213, a second voice coil 214, a second vibration diaphragm 215, and a housing 3.

DETAILED DESCRIPTION OF THE INVENTION

Embodiments of the Invention

In order to have a clearer understanding of the technical features, purposes and effects of the invention, the specific embodiments of the invention are described in detail with reference to the drawings. It is to be understood that where the terms “front”, “behind”, “upper”, “lower”, “left”, “right”, “longitudinal”, “transverse”, “vertical”, “horizontal”, “top”, “bottom”, “inner”, “outer”, “head”, “tail”, and the like indicate an orientation or positional relationship that is constructed and operated in a particular orientation based on the orientation or positional relationship shown in the drawings, It is only for the convenience of describing the technical solution, but not to indicate that the device or element must have a specific orientation, so it should not be understood as a limitation to the invention. It should also be noted that, unless otherwise specified and limited, the terms “mounting”, “connection”, “connecting”, “fixing” and “setting” should be interpreted broadly, for example, fixed connection, detachable connection or integral connection; It can be a direct connection or an indirect connection through an intermediate medium, and it can be the internal connection of two components or the interaction of two components. When an element is referred to as being “above” or “below” another element, the element can be “directly” or “indirectly” on the other element or there may also be one or more intervening elements. The terms “first”, “second”, “third”, etc., if used herein, are only for the convenience of describing the present technical solution, and shall not be understood as indicating or implying the relative importance or the number of the technical features indicated. Therefore, the technical features defined with “first”, “second”, or “third” may explicitly or implicitly include one or more technical features. Those of ordinary skill in the art can understand the specific meaning of the above terms in the present invention according to specific situations.

In the following description, for purposes of explanation and not limitation, specific details are set forth such as the particular system architecture, techniques, etc., in order to provide a thorough understanding of the present invention. However, it will be apparent to those skilled in the art that the present invention may be practiced in other embodiments without these specific details. In other instances, detailed descriptions of well-known systems, devices, circuits, and methods are omitted so as not to obscure the description of the present invention with unnecessary detail.

Figure 2:
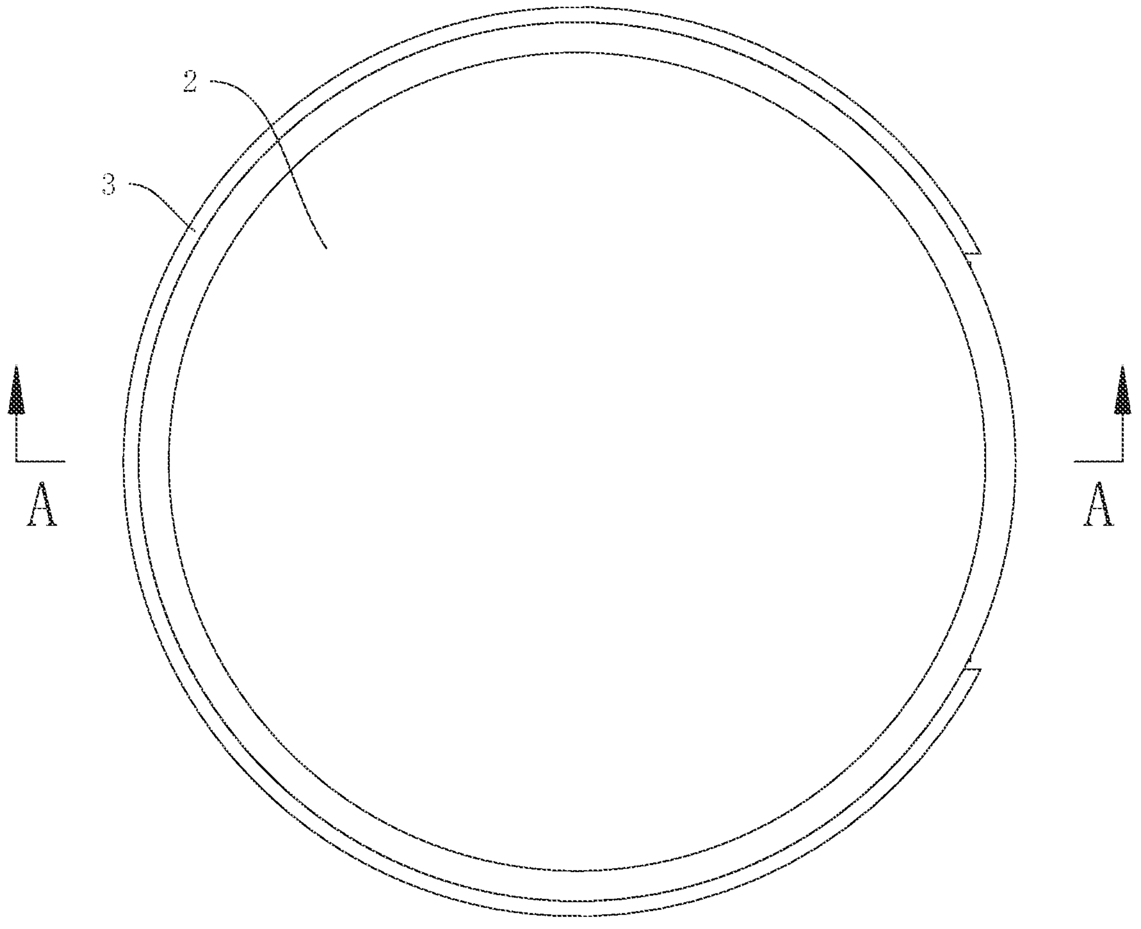
FIG. 2 is a top view of the speaker of FIG. 1
Figure 3:
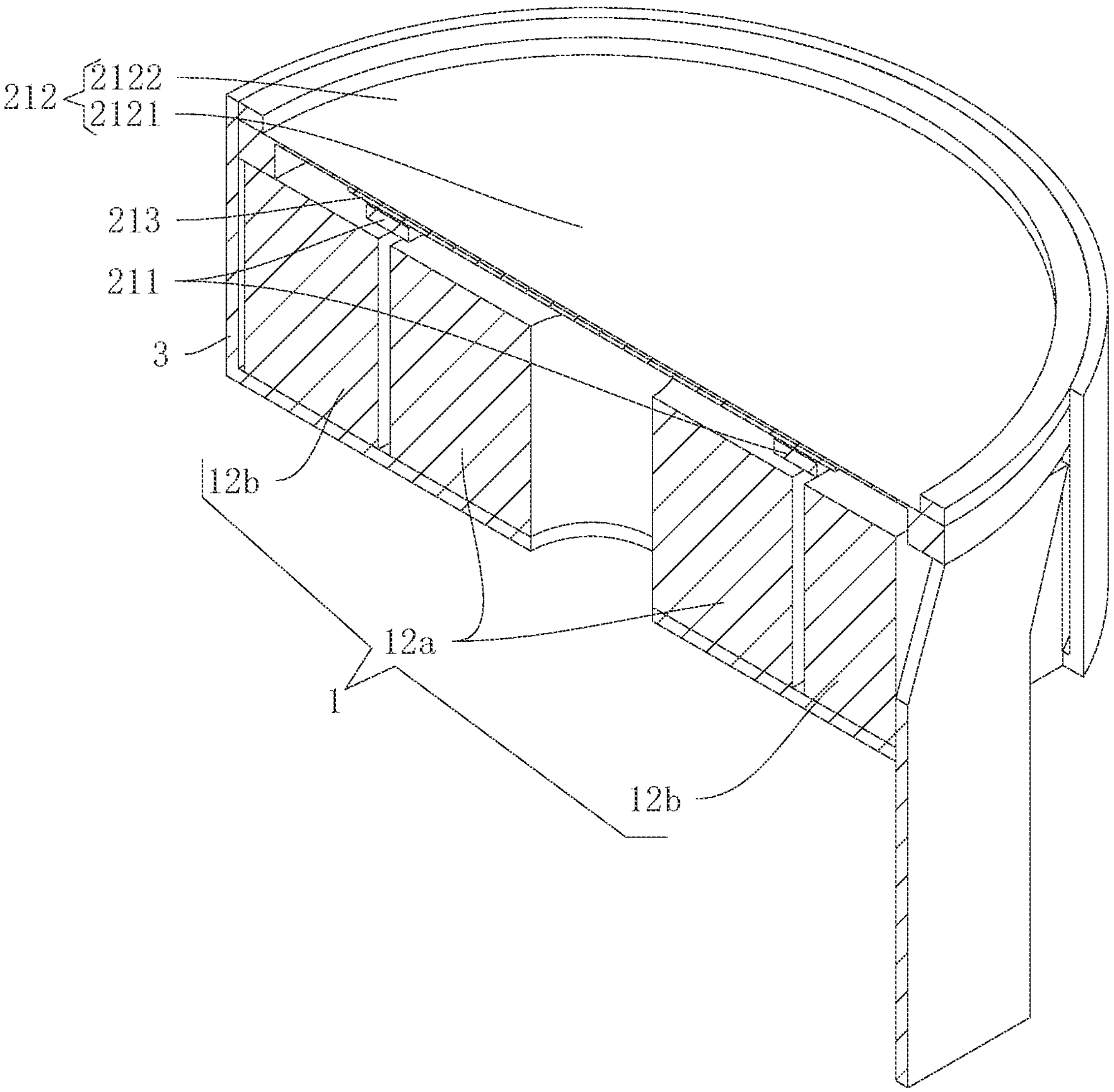
FIG. 3 is a cross-sectional view taken along line A-A of FIG. 2.

As shown in FIGS. 1-3, the speaker according to an embodiment of the present invention comprises a housing 3, and a magnetic circuit system 1 and a vibration system 2 disposed in the housing 3. The vibration system 2 comprises a planar first voice coil 211 capable of generating mechanical motion under the action of the magnetic field of the magnetic circuit system 1, a planar first vibration diaphragm 212 driven by the first voice coil 211, and a planar flaky dome 213, wherein the first voice coil is disposed on the first vibration diaphragm 212, and the dome 213 is disposed on the first vibration diaphragm 212.

Planar vibration diaphragm means that the vibration diaphragm as a whole is roughly planar, not absolutely planar. For example, if a small part of the vibration diaphragm is arched, but the whole is still roughly planar, it also belongs to a planar vibration diaphragm, just like a cuboid with rounded corners. Although it is not an absolute cuboid, it still belongs to the cuboid.

The speaker is different from a conventional moving-coil type speaker, can be made smaller than the conventional moving-coil type speaker, and has higher sound pressure level and better bandwidth in high frequency performance. The speaker can be applied to the speaker fields such as an earphone speaker, a mobile phone receiver, a mobile phone speaker, a notebook computer speaker and the like.

The first vibration diaphragm 212 comprises a intermediate portion 2121 and an folding ring 2122 surrounding the intermediate portion 2121. The folding ring 2122 is flat (referring FIG. 3) or arched (referring FIGS. 10-12).

The magnetic circuit system 1 comprises a plurality of magnets arranged in an array, one or more gaps are formed between the magnets, and at least a part of the first voice coil 211 corresponds to the gap between the magnets.

Referring to FIGS. 1-3, the magnetic circuit system 1 may comprise a first annular magnet 12*a* and a second annular magnet 12*b*, the second annular magnet 12*b* surround the first annular magnet 12*a*, and a annular gap is formed between the first annular magnet 12*a* and the second annular magnet 12*b*, the first voice coil 211 is disposed in the gap between the first annular magnet 12*a* and the second annular magnet 12*b*.

Figure 4:
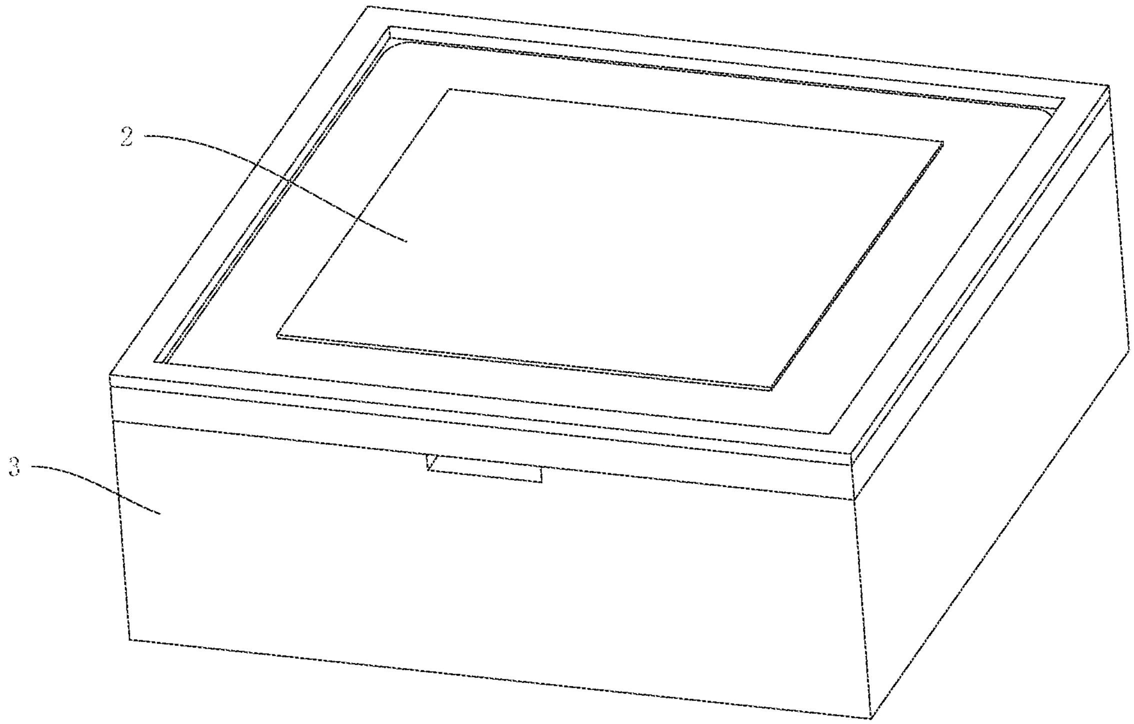
FIG. 4 is a perspective view of a speaker according to a second embodiment of the present invention.
Figure 5:
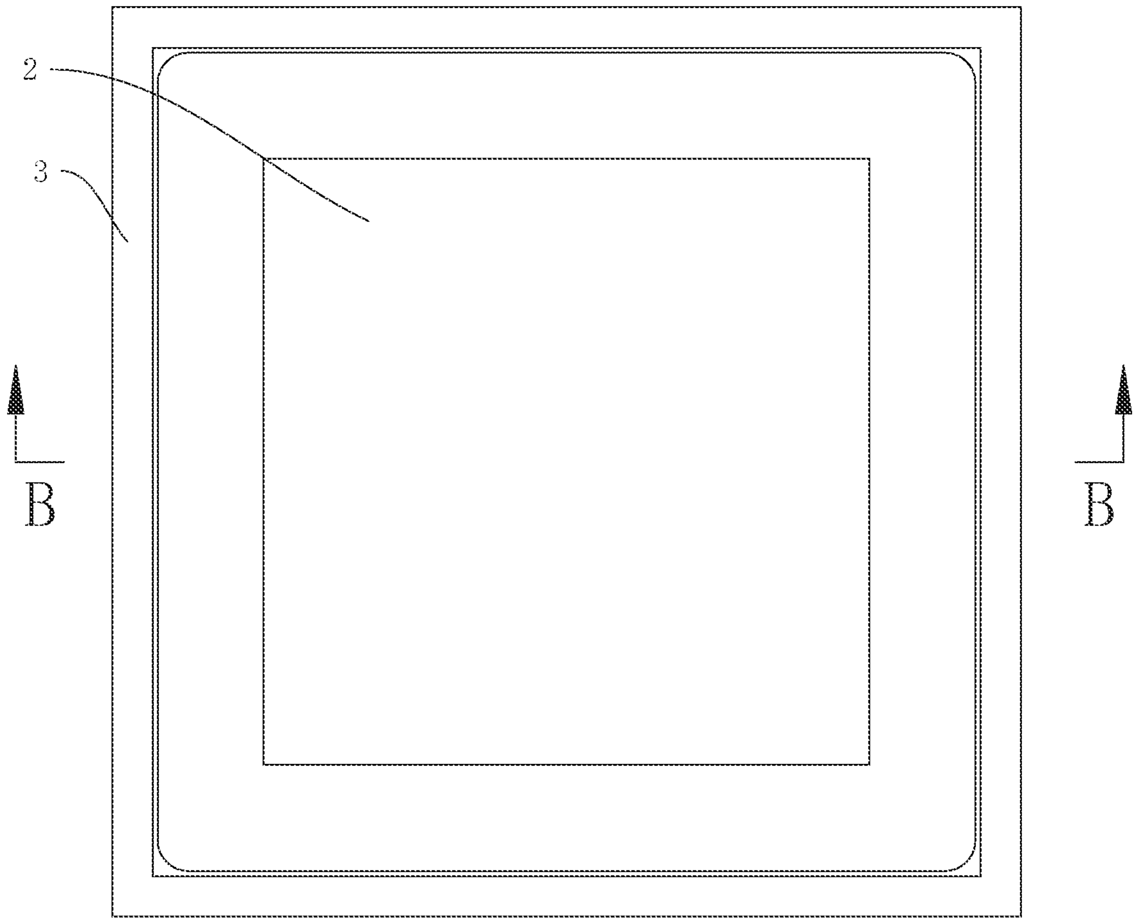
FIG. 5 is a top view of the speaker of FIG. 4.
Figure 6:
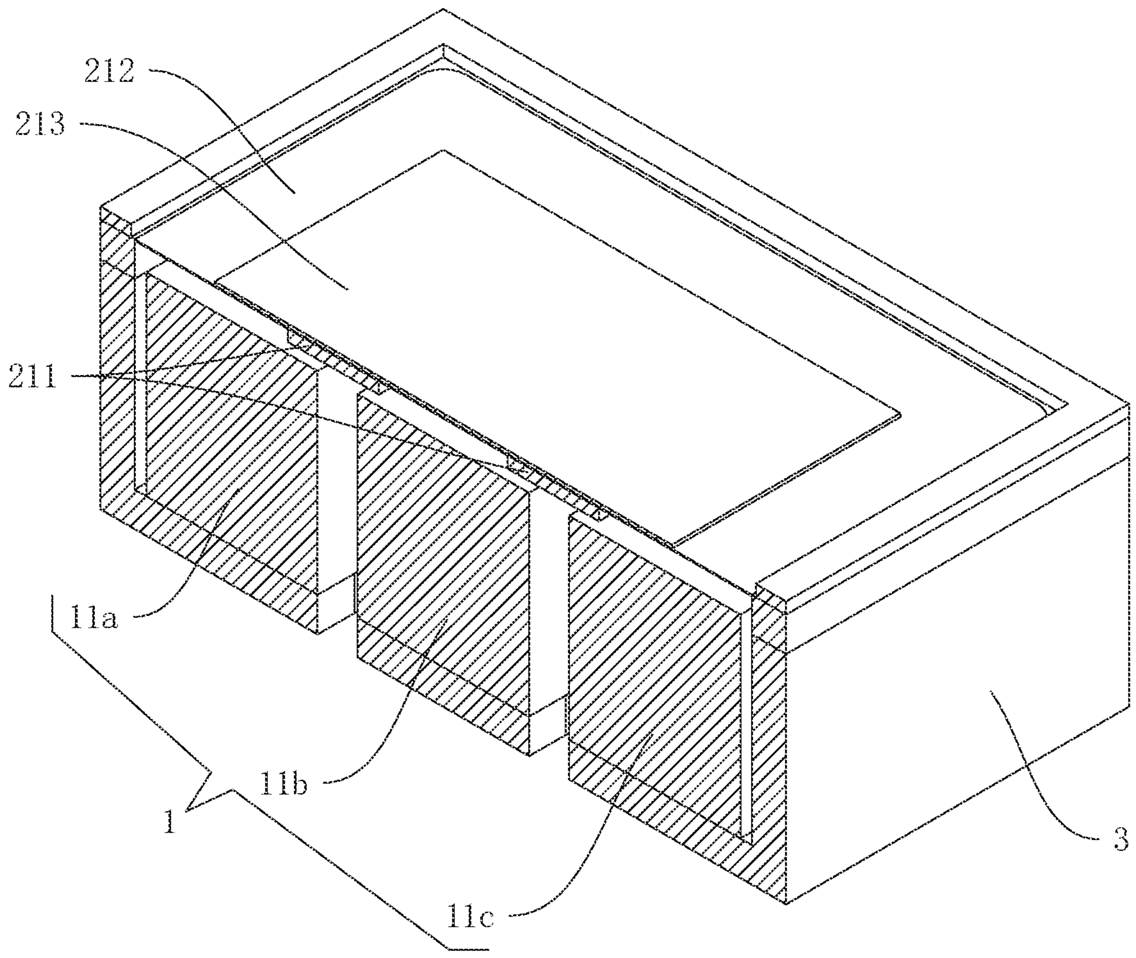
FIG. 6 is a sectional view taken along line B-B in FIG. 5.

Referring to FIGS. 4-6, the magnetic circuit system 1 may comprise a first elongated magnet 11*a*, a second elongated magnet 11*b*, and a third elongated magnet 11*c*, which are strip-shaped and spaced in sequence. At least a part of the first voice coil 211 corresponds to a gap between the first elongated magnet 11*a* and the second elongated magnet 11*b* as well as a gap between the second elongated magnet 11*b* and the third elongated magnet 11*c*. The first elongated magnet 11*a*, the second elongated magnet 11*b*, and the third elongated magnet 11*c* are preferably square magnets.

Figure 7:
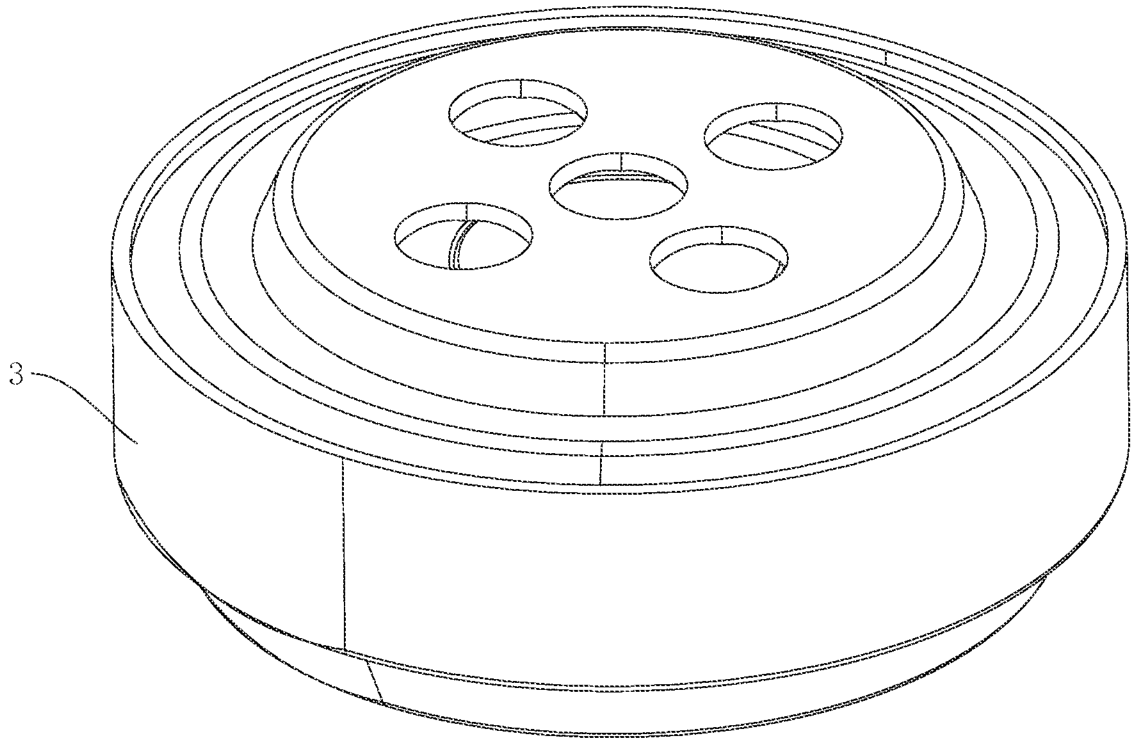
FIG. 7 is a perspective view of a speaker according to a third embodiment of the present invention.
Figure 8:
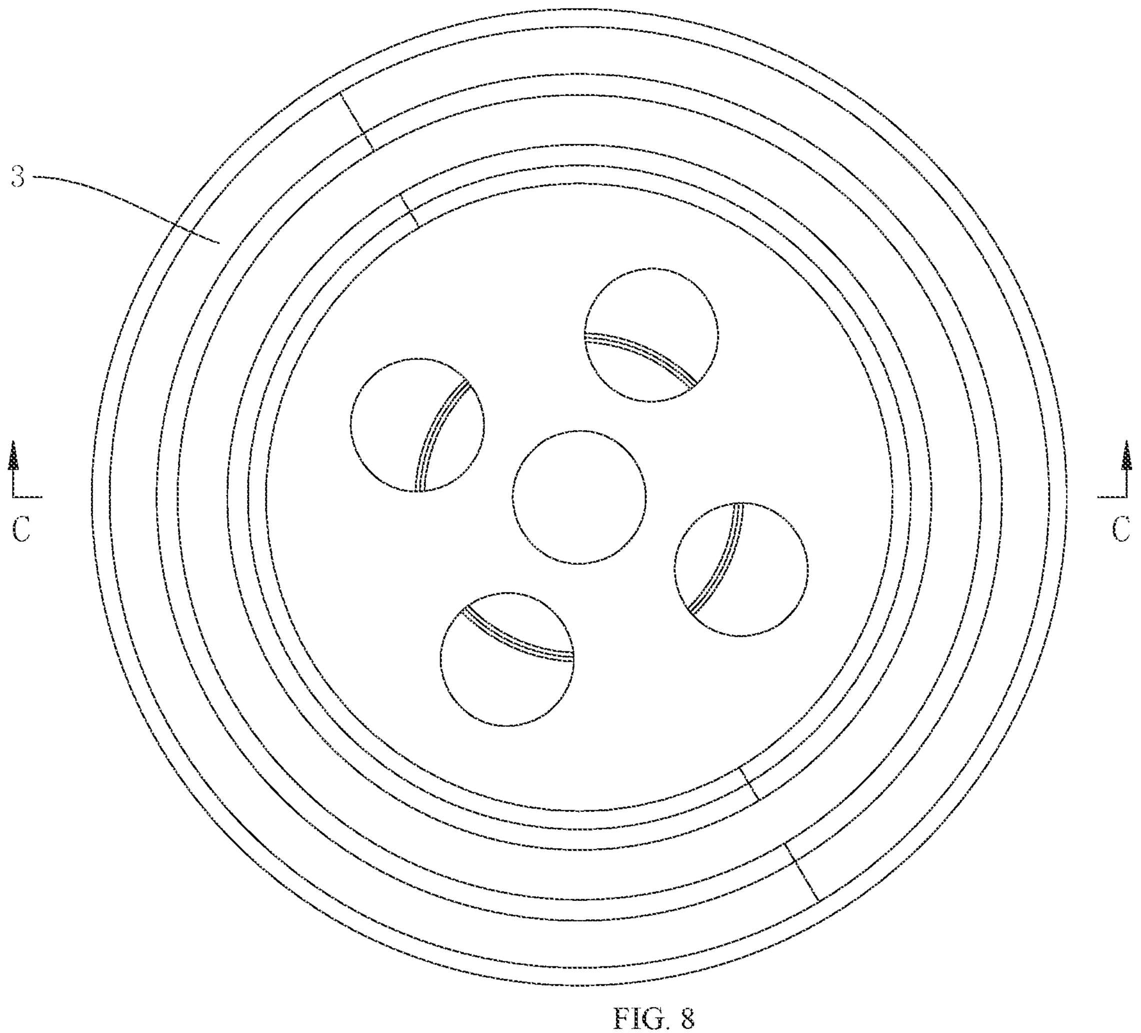
FIG. 8 is a top view of the speaker of FIG. 7.
Figure 9:
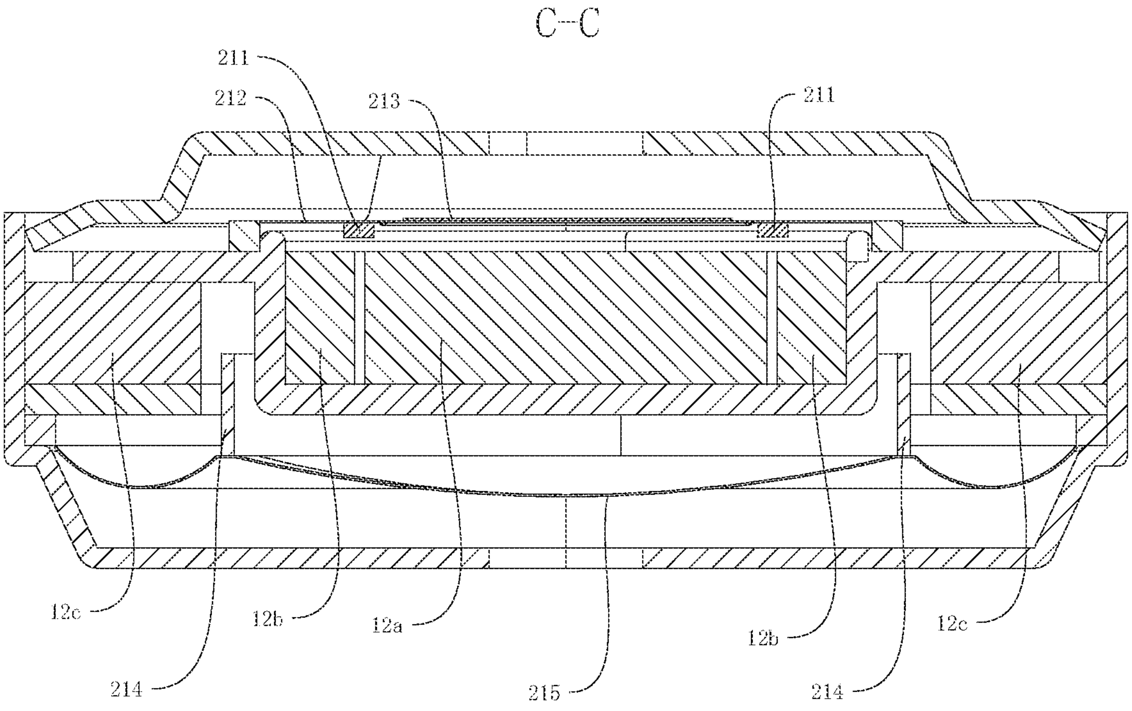
FIG. 9 is a cross-sectional view taken along line C-C in FIG. 8.

Referring to FIGS. 7-9, the magnetic circuit system 1 may comprise a first annular magnet 12*a*, a second annular magnet 12*b* surrounding the first annular magnet 12*a*, and a third annular magnet 12*c* surrounding the second annular magnet 12*b*, the vibration system 2 comprises a second voice coil 214 and a second vibration diaphragm 215 connected to the second voice coil 214 and driven by the second voice coil 214. The first voice coil 211 corresponds to a gap between the first annular magnet 12*a* and the second annular magnet 12*b*, and the second voice coils 214 corresponds to a gap between the second annular magnet 12*b* and the third annular magnet 12*c*. The second voice coil 214 may be a moving-coil type in the form of a ring standing on the vibration diaphragm and extending into the gap between the second annular magnet and the third annular magnet.

In the above embodiment, preferably, when the vibration system 2 comprises the dome 213, the dome 213 is provided in the middle of the first vibration diaphragm 212.

Figure 10:
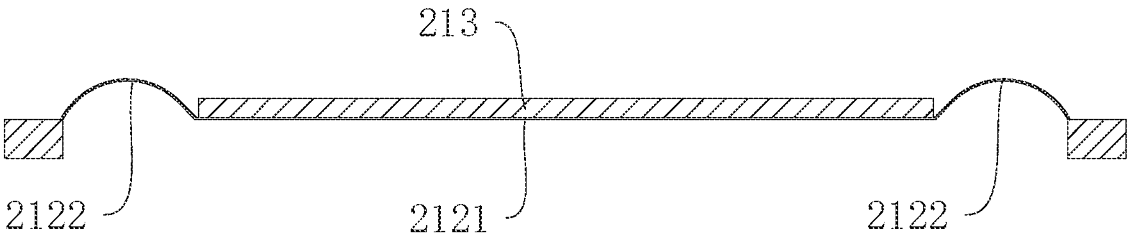
FIG. 10 is a structural schematic diagram of an embodiment of the vibration diaphragm and the dome of the speaker of the present invention (the dome is arranged on the upper side of the vibration diaphragm).
Figure 11:
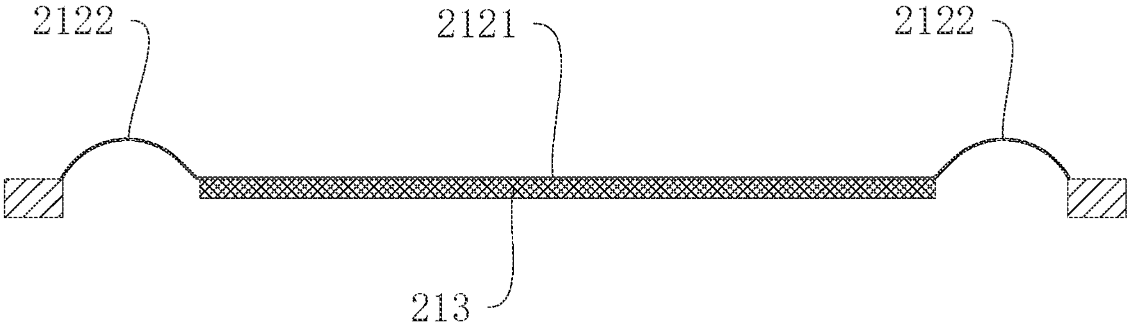
FIG. 11 is a structural schematic diagram of another embodiment of the vibration diaphragm and the dome of the speaker of the present invention (the dome is arranged below the vibration diaphragm).
Figure 12:
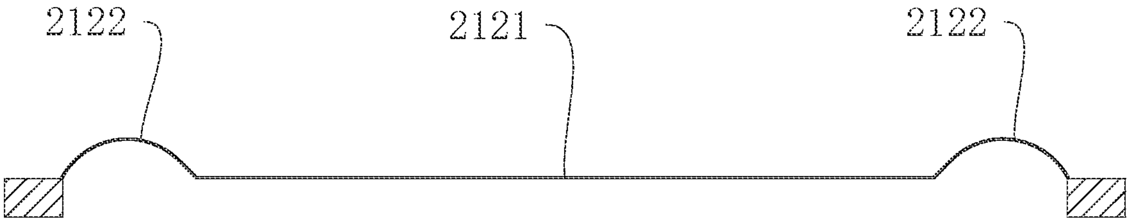
FIG. 12 is a structural schematic diagram of another embodiment of the vibration diaphragm of the speaker of the present invention (the vibration diaphragm is not provided with a dome).

In the above embodiment, when the vibration system 2 comprises a dome 213, referring to FIG. 10, the dome 213 is provided on the top surface of the first vibrating diaphragm 212, or referring to FIG. 11, the dome 213 is provided on the bottom surface of the first vibrating diaphragm 212, or the dome 213 is embedded in the first vibrating diaphragm 212 and exposed upward and downward, Referring to FIG. 12, the vibration system 2 may not comprise a dome.

As for the shape of the speaker, referring to FIGS. 1-3, the housing 3 may be circular, the first vibration diaphragm 212 is circular and the dome 213 is circular or referring to FIGS. 4-6, the housing 3 may be square, the first vibration diaphragm 212 is square and the dome 213 is square.

The above description is only a preferred embodiment of the invention, and is not intended to limit the invention. For those skilled in the art, the invention can have various modifications, combinations and changes. Any modification, equivalent substitution, improvement, etc. within the spirit and principle of the invention shall be included in the scope of the claims of the invention.

What is claimed is:

1. A speaker comprising a housing, and a magnetic circuit system and a vibration system arranged in the housing, wherein the vibration system comprises a planar first voice coil capable of generating mechanical motion under the action of a magnetic field of the magnetic circuit system, and a planar first vibration diaphragm driven by the first voice coil, wherein the first voice coil is arranged on the first vibration diaphragm, and the magnetic circuit system comprises a plurality of magnets; a gap is formed between the magnets, at least part of the first voice coil corresponds to the gap between the magnets, the first voice coil does not protrude into the gap between the magnets; the magnetic circuit system comprises a first annular magnet, a second annular magnet surrounding the first annular magnet, and a third annular magnet surrounding the second annular magnet; the vibration system comprises a second voice coil and a second vibration diaphragm connected to the second voice coil and driven by the second voice coil, the first voice coil corresponds to a gap between the first annular magnet and the second annular magnet, and the second voice coil corresponds to a gap between the second annular magnet and the third annular magnet.

2. The speaker according to claim 1, wherein the first vibration diaphragm comprises an intermediate portion and a folding ring surrounding the intermediate portion, and the folding ring is flat or arc-shaped.

3. The speaker according to claim 1, wherein the magnetic circuit system comprises a first elongated magnet, a second elongated magnet and a third elongated magnet which are sequentially arranged at intervals; at least a portion of the first voice coil corresponds to a gap between the first elongated magnet and the second elongated magnet and a gap between the second elongated magnet and the third elongated magnet.

4. The speaker according to claim 3, wherein the first elongated magnet, the second elongated magnet, and the third elongated magnet are square magnets.

5. The speaker according to claim 1, wherein the magnetic circuit system comprises a first annular magnet and a second annular magnet, the second annular magnet is surrounding the first annular magnet, an annular gap is formed between the first annular magnet and the second annular magnet, and the first voice coil is correspondingly arranged in the gap between the first annular magnet and the second annular magnet.

6. The speaker according to claim 1, wherein the vibration system comprises a planar flaky dome, the dome is arranged on the first vibration diaphragm.

7. The speaker according to claim 6, wherein the dome is arranged in the middle of the first vibration diaphragm.

8. The speaker according to claim 6, wherein the dome is provided on the top surface of the first vibration diaphragm, or the dome is provided on the bottom surface of the first vibration diaphragm, or the domes are embedded in the first vibration diaphragm and exposed upward and downward.

9. The speaker according to claim 6, wherein the housing is circular, the first vibration diaphragm is circular and the dome is circular, or the housing is square, the first vibration diaphragm is square and the dome is square.

* * * * *